United States Patent [19]

Yamamoto et al.

[11] 4,445,208
[45] Apr. 24, 1984

[54] SIGNAL DETECTING SYSTEM IN OPTICAL INFORMATION READING APPARATUS

[75] Inventors: Kimiaki Yamamoto; Kenichi Ito, both of Hachiouji, Japan

[73] Assignee: Olympus Optical Co., Ltd., Tokyo, Japan

[21] Appl. No.: 333,697

[22] Filed: Dec. 23, 1981

[30] Foreign Application Priority Data

Dec. 27, 1980 [JP] Japan .................................. 55-188796

[51] Int. Cl.$^3$ .............................................. G11B 7/12
[52] U.S. Cl. ........................................ 369/44; 369/46; 369/109
[58] Field of Search ................ 369/46, 109, 44, 111, 369/118; 250/202, 237 R; 350/162, 11

[56] References Cited

U.S. PATENT DOCUMENTS 4,011,400  3/1977  Simons .................................. 369/46
4,349,901  9/1982  Howe .................................... 369/46

FOREIGN PATENT DOCUMENTS 5319806  2/1978  Japan ................................... 369/46

OTHER PUBLICATIONS

Position sensing in video disk readout.

Primary Examiner—Alan Faber
Attorney, Agent, or Firm—Cushman, Darby & Cushman

[57] ABSTRACT

In a signal detecting system in an optical information reading apparatus wherein, in order that a tracking signal having few errors can be obtained, the pupil of an objective used to project a light from a light source as a spot onto the information recording track of a disk, collect the light reflected on the disk and lead it to a light receiving device is covered in the form of a band or a cover plate placed in front of detectors of the light receiving device to intercept a part of the light entering the dectector.

3 Claims, 13 Drawing Figures $2\Delta$

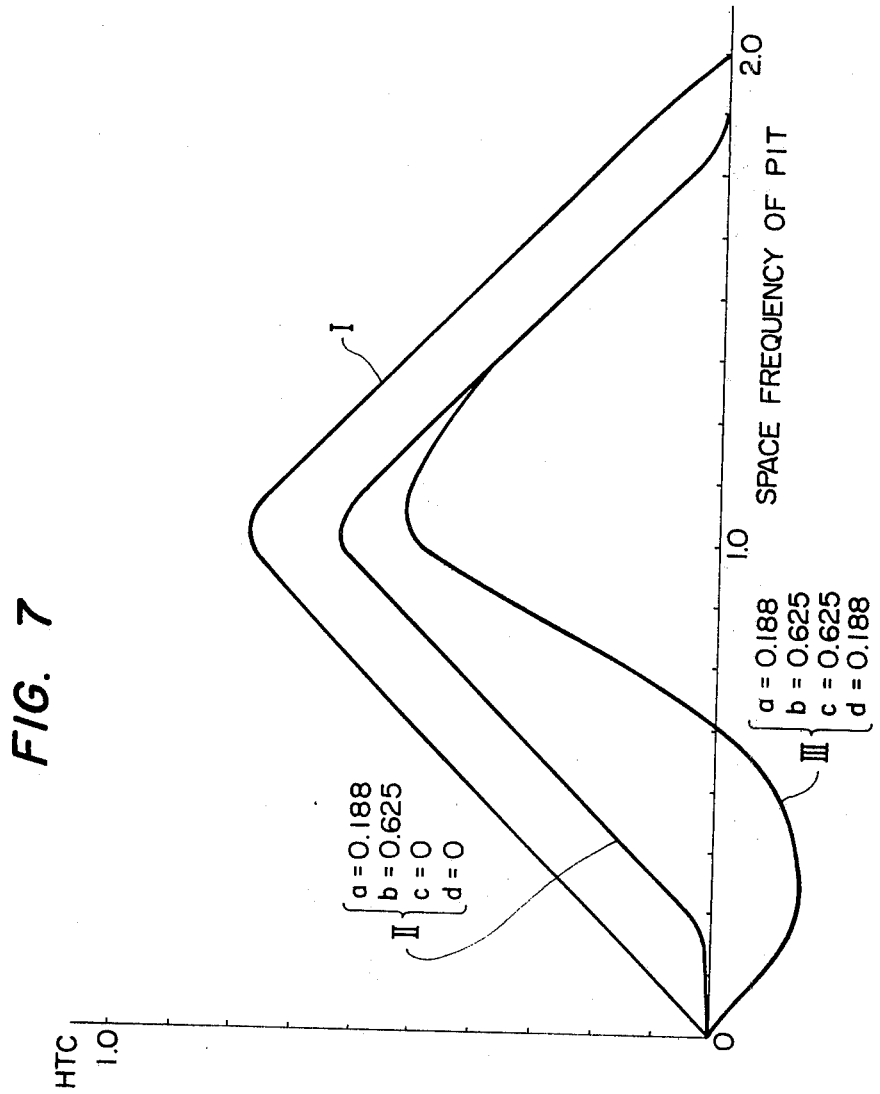

SIGNAL DETECTING SYSTEM IN OPTICAL INFORMATION READING APPARATUS

BACKGROUND OF THE INVENTION (a) Field of the Invention

This invention relates to a signal detecting system in an optical information reading apparatus wherein, in order that a beam radiated from a light source is collected and is projected onto a recording medium having a track having recorded information and a light pencil modulated by the recorded information is received, four detectors divided respectively in the above mentioned track direction and the direction intersecting at right angles with it are arranged with the optical axis as a center in the far field of the above mentioned track.

(b) Description of the Prior Art

There is known, for example, such optical information reading apparatus wherein information is read by focusing a reading light spot through an objective on an information track recorded spirally or concentrically circularly on a recording medium. There is a recording medium having an information track and called, for example, a video disk, audio disk or data disk. In such disk, coded video signals, audio signals or data signals are recorded in the information track as optical information which can be represented by an optical transmission characteristic, reflection characteristic or phase characteristic. The information recorded in such disk is read by focusing through an objective on the information track a laser light radiated from a laser light source while the disk is rotated at a high speed and detecting a transmitted light or reflected light modulated by the information track. One of the features of such recording medium is that the information recording density is very high. Therefore, the width of each information track is very narrow and the spacing between the successive information tracks is also very narrow. In order to accurately read the original information from the information track thus narrow in both width and pitch, it is necessary to always accurately project on the track of the disk a beam spot focused by the objective. However, as the relative positions of the disk and objective fluctuate, the spot can not always be held on the track. Therefore, such optical reading apparatus is controlled by a servomechanism whereby the position lag of the beam spot from the information track is detected and the spot is displaced in the direction at right angles with the information track and the optical axis of the objective and the optical axis direction of the objective on the basis of this position lag signal.

FIG. 1 shows the optical system of the above described disk reading apparatus. A disk 1 is rotated at a speed, for example, of 1800 revolutions per minute by a spindle 2. A concentric circular or spiral track 3 is recorded on the disk 1. Such light as a laser light radiated out of a light source 4 is focused by a lens 5, half mirror 6, reflecting mirror 7 and objective 8 and is projected as a spot on the track 3 of the disk 1. The light reflected by the disk 1 is collected by the objective 8 and the light reflected by the reflecting mirror 7 and half mirror 6 is made to enter the light receiving device 10 through a lens 9. As shown in FIG. 2, this light receiving device has four detectors 11 to 14 divided respectively in the track direction (x—axis direction) and the direction (y—axis direction) intersecting at right angles with it. These detectors are arranged in the far field zone of the information track 3. That is to say, these detectors 11 to 14 are arranged at the position well away from the image of the pit structure formed by the objective 8 so that the diffracted beams of various orders formed by the pit structure of the information track can be detected as separated.

The following two methods of detecting tracking errors in such detecting system are considered.

The first is a method whereby, when the signals of the RF band detected by the respective detectors 11, 12, 13 and 14 are made respectively $i_1$, $i_2$, $i_3$ and $i_4$, the RF signal $(i_1+i_2+i_3+i_4)$ lagging by a ¼ period phase will be superimposed on the signal of $(i_1+i_3)-(i_2+i_4)$ and the signal obtained thereby will be passed through a low band passage filter to obtain a tracking error signal $i_{TC}$. This method shall be explained more particularly. Generally, in a video disk, an information signal is recorded by being superimposed as FM modulated on a carrier of a predetermined frequency. It is known that, in such optical system as is shown in FIG. 1, in the case of reading the information signal recorded in the video disk, in case the optical axis of the objective 8 is on the track the beam entering the light receiving device 10 will be linearly symmetrical with respect to the track direction. However, in case the optical axis and track lag from each other, that is to say, in case a tracking error is present, the beam on the light receiving device 10 will be no longer linearly symmetrical with respect to the track direction. Therefore, in case there is no tracking error, $(i_1+i_3)-(i_2+i_4)$ will become zero but, in case there is a tracking error, the signal of $(i_1+i_3)-(i_2+i_4)$ will be obtained as a signal of the RF band the same as the video signal and the tracking error will be superimposed on it as an envelope. In order to obtain the tracking error signal $i_{TC}$, it is necessary to extract only the envelope from this signal. The signal of $(i_1+i_2)-(i_2+i_4)$ can be written as in the following formula:

$$(A+B \sin 2\pi \nu V_t) \sin \omega t$$

wherein $\nu$ represents the frequency of the envelope (tracking error signal) and $\omega$ represents the frequency of the video signal (in the RF band). Further, $\nu << \omega$. On the other hand, the video signal is in the form of $\cos \omega t$. Therefore, if the video signal $(i_1+i_2+i_3+i_4)$ as lagging in the phase by a ¼ period $(\pi/2)$ is superimposed on the signal $i_{TC}$, aside from the coefficient, a signal of $(A+B \sin 2\pi\nu V_t) \sin^2 \omega t$ will be obtained. If the signal obtained by this superimposition is applied to the low band passage filter, the $\sin^2 \omega t$ component of the RF band will be cut and only the envelope will be obtained. It will be obtained in the form of $A+B \sin 2\pi\nu V_t$ to be used as the signal $i_{TC}$ for detecting tracking errors.

Now the second method shall be described. It is a method whereby $(i_1+i_2)-(i_3+i_4)$ is determined on the basis of the signals $i_1$, $i_2$, $i_3$ and $i_4$ in the tracking error signal band obtained from the respective detectors 11, 12, 13 and 14 of the light receiving device 10 and is used as a tracking error detecting signal $i_{TP}$. This corresponds to dividing the detecting signal into two vertically (in the direction vertical to the track) and taking the difference between them. In this method, as different from the first method, the signal $i_{TP}$ will be obtained directly as a signal in the tracking error band (low frequency). In this case, too, the obtained signal will be in the form of $A+B \sin 2\pi\nu V_t$ wherein A and B depend on the spacial frequency of the pits and track spacing and the lag between the optical axis of the lens and the center of the light receiving device and A will be zero when the optical axis of the lens and the center of the light receiving device coincide with each other but will not be zero when they do not coincide with each other and will become larger in proportion to the amount Δ of non-coincidence. Therefore, in such optical system wherein the track is traced by a lens moved independently of the light receiving device, when the lens is displaced following the eccentricity of the disk, such bias fluctuation signal A as has the disk rotation frequency as a basic frequency will be produced and will be a factor of a large error in the tracking signal detection.

SUMMARY OF THE INVENTION

An object of the present invention is to provide a signal detecting system wherein a tracking signal having very few errors is obtained by eliminating or reducing a bias fluctuation in such optical information reading apparatus as is described above.

According to the present invention, this object is attained by covering a part of a light pencil in any position which can be considered to be in a far field zone.

According to a preferred formation of the present invention, at least a part of a light pencil to pass through a band-shaped part in the direction along a track near an optical axis is covered in a far field zone in a light path leading to a recording medium from a light source.

According to another preferred formation of the present invention, at least a part of a light pencil reaching a dividing line of detectors is covered in a far field zone in a light path leading to the detectors from a recording medium.

By such formation, as a bias component to cause errors is accurately eliminated or reduced, a tracking signal having few errors can be obtained.

This and other objects of the present invention will become more apparent during the course of the following detailed description and appended claims.

BRIEF DESCRIPTION OF THE DRAWINGS

FIG. 7 is a graph showing the value of $H_{TC}$ when the detecting surface is covered;

DESCRIPTION OF THE PREFERRED EMBODIMENTS

Figure 1:
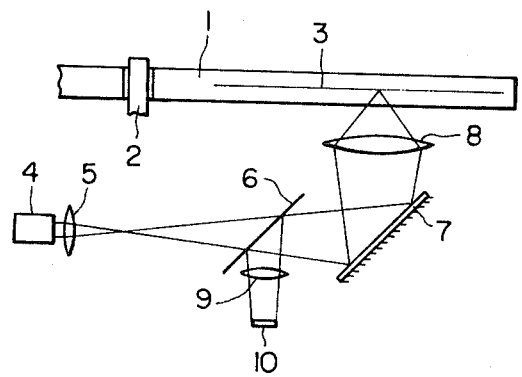
FIG. 1 is a view showing an optical system to be used in the signal detecting system according to the present invention.
Figure 2:
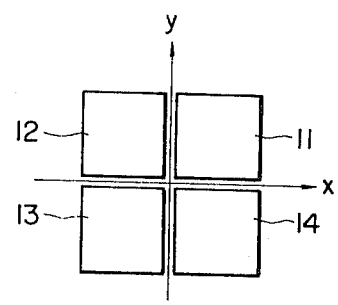
FIG. 2 is a view showing an arrangement of respective detectors of a light receiving device.
Figure 3A:
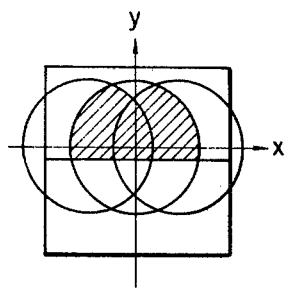
FIGS. 3A, 3B, 3C, 3D and 4 are views showing respectively the component H contributing to bias fluctuation in the first method for detecting a tracking signal.
Figure 3B:
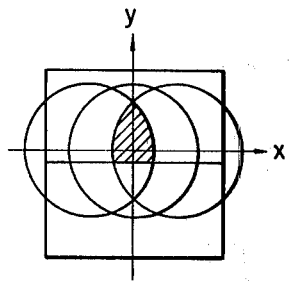
Figure 3C:
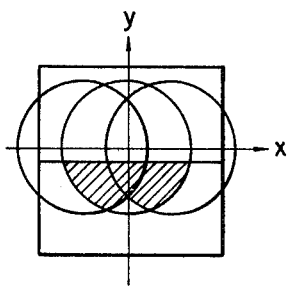
Figure 3D:
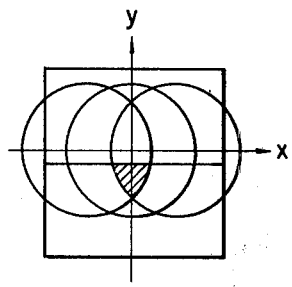

Now, if a light coming out of a light source is diffracted and reflected by a disk having a reflection factor of a period structure and the returning light pencil is received in a light receiving device, then a detecting signal $i_1(t)$ in the detector 11 in the light receiving device will be represented by the following formula:

$$i_1(t) = \sum_{m n m' n'} R(m,n) R^*(m,n) H^1(m,n;m',n') e^{2\pi i (m'-m) a \omega \mu t} \quad (1)$$

wherein $$H^1(m,n;m',n') = \iint f(x-m\mu, y-n\nu) f^*(x-m'\mu, y-n'\nu) dx dy \quad (2)$$

wherein $\mu$, $\nu$ and R(m, n) represent respectively spacial frequencies in the track direction and radial direction of the reflection factor of the disk and a Fourier coefficient, f(x, y) represents a reflection distribution on a pupil of a light incident upon the pupil and * represents a complex conjugation.

According to the formula (1), the size of $i_1$ depends on H(m, n; m', n'). Further, according to the formula (1), the detecting signal in the video disk reading system is understood to be formed by the beat of a spectrum but the component A included in the tracking signal $i_{TC}$ in the RF band is generated mostly by the beat between the spectrum (0, 0) and spectrum (±1, 0). If the x—direction is made the track direction, H(m, n; m', n') of the detecting signals $i_1$, $i_2$, $i_3$ and $i_4$ detected by the respective detectors 11, 12, 13 and 14 of the light receiving device will be represented respectively as in the following formulas (3) to (6)

$$H^1(n,n;m',n') = \iint f(x-m\mu, y-n\nu) f^*(x-m'\mu, y-n'\nu) dx dy \quad (3)$$

$$H^2(m,n;m',n') = \iint f(x-m\mu, y-n\nu) f^*(x-m'\mu, y-n'\nu) dx dy \quad (4)$$

$$H^3(m,n;m',n') = \iint f(x-m\mu, y-n\nu) f^*(x-m'\mu, y-n'\nu) dx dy \quad (5)$$

$$H^4(m,n;m',n') = \iint f(x-m\mu, y-n\nu) f^*(x-m'\mu, y-n'\nu) dx dy \quad (6)$$

However, the integration will be made within the zones of the respective detectors 11, 12, 13 and 14. Therefore, from the above formulas, H(m, n; m', n') of the component A included in the signal $i_{TC}$ will be represented by the following $H_{TC}$:

$$\begin{aligned}H_{TC} = &\{H^1(0,0;1,0) + H^2(0,0;-1,0)\} \\ &- \{H^1(0,0;-1,0) + H^2(0,0;1,0)\} \\ &- \{H^4(0,0;1,0) + H^3(0,0;-1,0)\} \\ &- \{H^4(0,0;-1,0) + H^3(0,0;1,0)\}\end{aligned} \quad (7)$$

wherein f(x, y) represents an amplitude distribution of the light on the lens pupil of the incident light, $\mu$ represents a spatial frequency in the track direction of pits having a period structure and * represents a complex conjugation. Further, it is standardized that the coordinate system takes a diffraction unit system on the disk and that the maximum radius of the lens pupil is 1.

From the above formula (7), the component H contributing to the bias fluctuation is illustrated to be as in FIG. 3.

Figure 4:
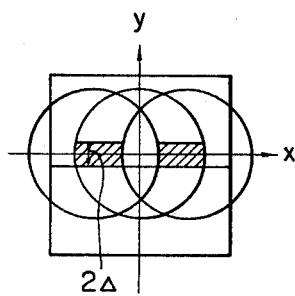

That is to say, when the objective has no aberration, $\{H^1(0, 0; 1, 0) + H^2(0, 0; 1, 0)\}$, $\{H^1(0, 0; -1, 0) + H^2(0, 0; 1, 0)\}$ $\{H^4(0, 0; 1, 0) + H^3(0, 0; -1, 0)\}$ and $\{H^4(0, 0; -1, 0) + H^3(0, 0; 1, 0)\}$ will be equivalent to the areas of the hatched parts respectively in FIGS. 3A, 3B, 3C and 3D and therefore $H_{TC}$ will be equivalent to the area of the parts shown by hatchings in FIG. 4. Therefore, if the pupil moving integrally with the objective 8 is covered in the form of a band as in FIG. 5, $H_{TC}$ will be able to be reduced (when $\delta<\Delta$) or made zero (when $\delta \geq \Delta$) and the bias fluctuation A will be able to be substantially eliminated. Further, it is clear that, even if it is covered partly in the form of a rectangle instead of the form of a band, there will be an effect on the reduction.

Figure 6A:
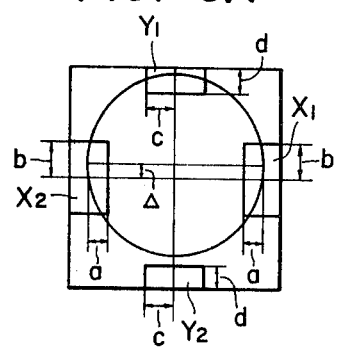
FIGS. 6A and 6B are views showing another example in which a part of pupil is covered to remove the bias fluctuation.
Figure 6B:
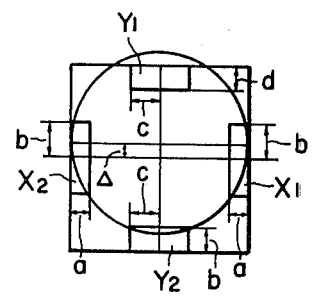

The method of moving the bias fluctuation A by placing a cover plate in front of detectors of a light receiving device shall be described in the following. By the same analysis as in the above described explanation, the bias fluctuation A can be reduced by covering the parts shown by $X_1$ and $X_2$ on the x-axis and $Y_1$ and $Y_2$ on the y-axis as in FIGS. 6A and 6B. FIG. 7 shows $H_{TC}$ in the case that the intensity distribution of the incident beam is made uniform and the lag between the center of the lens pupil and the center of the light receiving device is 0.125. In this diagram, the curve I is of the case that there is no cover, the curve II is of the case that the values of the illustrated a, b, c and d are respectively a=0.188, b=0.625, c=0 and d=0 (no cover in $Y_1$ and $Y_2$) and the curve III is of the case of a=0.188, b=0.625, c=0.625 and d=0.188. As evident from this diagram, even in the case of covering in front of the light receiving device, there will be an effect of reducing the bias fluctuation A. Further, it is found that the covering in both of the track direction and the direction intersecting at right angles with it is more effective. However, even with only $X_1$ and $X_2$ on the x-axis, a sufficient effect will be obtained.

The case based on the $i_{TC}$ signal has been explained in the above. Now, the case of using the tracking signal $i_{TP}$, that is, $(i_1+i_2)-(i_3+i_4)$ shall be explained. The component A included in the signal $i_{TP}$ will be formed by a self-beat. Particularly the spectrum (0, 0) component will greatly contribute and the bias fluctuation A will depend on $H_{TP}$ represented by the following formula (8):

$$H_{TP} = \{H^1(0,0;0,0) + H^2(0,0;0,0)\} \\ - \{H^3(0,0;0,0) + H^4(0,0;0,0)\} \quad (8)$$

Figure 5:
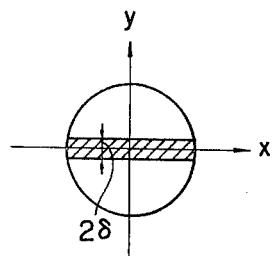
FIG. 5 is a view showing an example in which a part of pupil is covered to remove the bias fluctuation.
Figure 8:
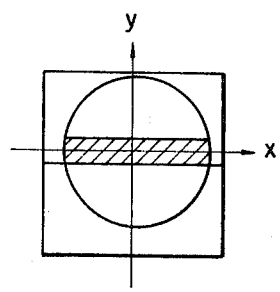
FIG. 8 is a view showing the component $H_{TP}$ contributing to bias fluctuation.

As the above mentioned $H_{TP}$ represents the area of the hatched part shown in FIG. 8, by masking the pupil part of the objective 8 in the form of a band as in FIG. 5 or a part of the band-shaped part, the bias fluctuation component A can be reduced. Further, as regards the method of covering the light receiving device, if the formula (8) is considered, it will be evident that the bias fluctuation component A can be reduced by such covering as is shown in FIG. 6. It is effective to cover particularly the parts $Y_1$ and $Y_2$.

It is shown in the above that the bias fluctuation can be reduced or eliminated by covering the pupil of the objective 8 or a part of the detectors 11, 12, 13 and 14. However, in practice, it is not necessary to place the cover plate just before the lens pupil and detectors. If anything having a covering effect is arranged in any position considered to be in a far field zone with respect to the disk, the same effect will be obtained.

Figure 9:
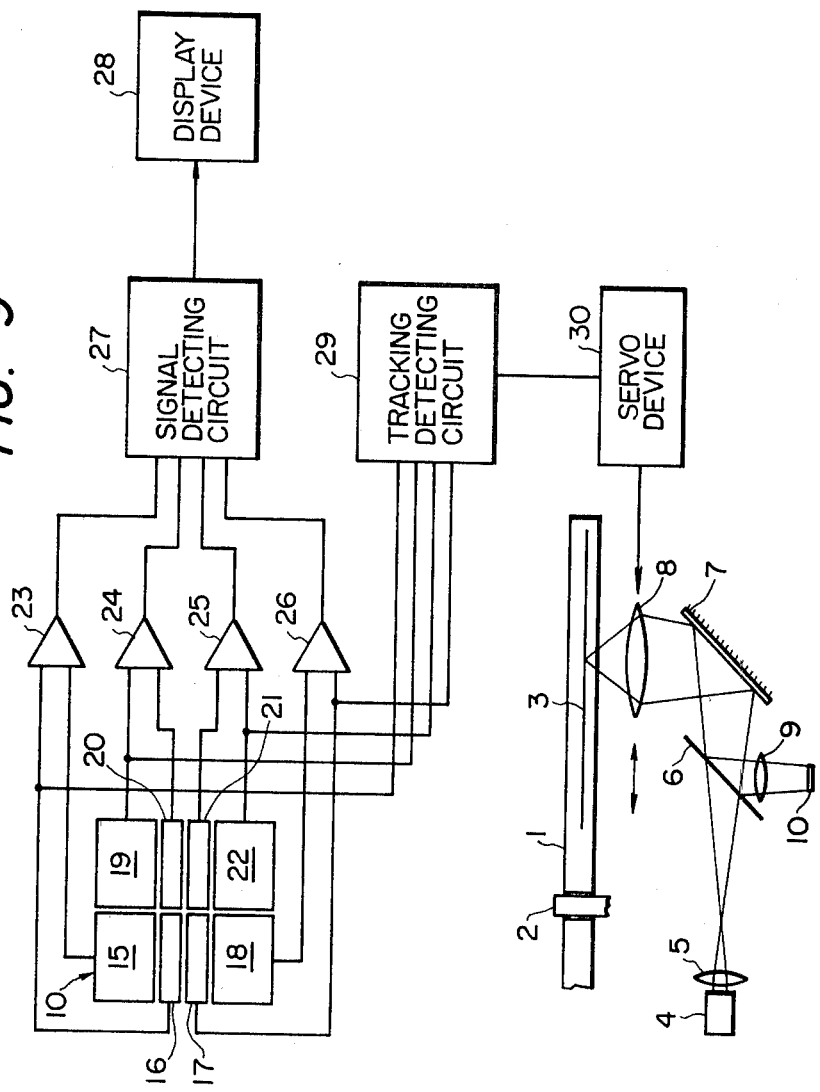
FIG. 9 is a view showing an example of the detecting electric system according to the present invention.

Further, in the case of the method of covering the detectors, even if the detecting electric system is so formed as to neglect the detecting signal $i_n$ from the part corresponding to the part to be covered instead of dividing the detector and placing the cover plate, the same effect will be obtained. FIG. 9 shows an embodiment of such detecting electric system. That is, the light receiving device 10 has eight detectors 15 to 22 and the detectors 16, 17, 20 and 21 correspond to the part to be covered. Reference numerals 23 through 26 represent adding circuits, 27 represents a signal detecting circuit, 28 represents a display device, 29 represents a tracking detecting circuit and 30 represents a servodevice for moving the objective 8. In case a video disk is used, the display device 28 will be a TV monitor. As the detecting electric system is arranged as shown in FIG. 9, signals only from the detectors 15, 18, 19 and 22 can be input into the tracking detecting circuit 29 and signals from all detectors will be input into the signal detecting circuit 27. Therefore, when a tracking error is to be detected, signals from the detectors 16, 17, 20 and 21 are neglected and when signals are to be detected, all detectors will be used. In this case, the component $i_n$ will be able to contribute to the detection of the RF signal and the like. Therefore, it can be said to be a better method.

We claim:

1. A signal detecting system in an optical information reading apparatus comprising a light source, an optical system which can focus a light pencil from said light source and project it onto a recording medium including a track having recorded information and a light receiving device which is set within a far field zone of said track and includes a plurality of detectors divided respectively in the direction along said track and the direction intersecting at right angles with it with the optical axis as a center to receive through said optical system a light pencil reflected from said recording medium and modulated by the information recorded in said track, a part of said light pencil being covered in a predetermined position within said far field zone to detect a tracking signal representing a lag in the direction intersecting at right angles with the direction along said track between the light pencil from said light source and said track and the direction of the lag and to control the bias fluctuation in said tracking signal and wherein at least a part of the light pencil passing through a band-shaped part in the direction along said track near the optical axis is covered within said far field zone in the light path leading to said recording medium.

2. A signal detecting system in an optical information reading apparatus comprising a light source, an optical system which can focus a light pencil from said light source and project it onto a recording medium including a track having recorded information and a light receiving device which is set within a far field zone of said track and includes a plurality of detectors divided respectively in the direction along said track and the direction intersecting at right angles with it with the optical axis as a center to receive through said optical system a light pencil reflected from said recording medium and modulated by the information recorded in said track, a part of said light pencil being covered in a predetermined position within said far field zone to detect a tracking signal representing a lag in the direction intersecting at right angles with the direction along said track between the light pencil from said light source and said track and the direction of the lag and to control the bias fluctuation in said tracking signal and wherein at least a part of the light pencil reaching the dividing lines of said detectors is covered in said far field zone in the light path leading to said detectors from said recording medium.

3. A signal detecting system in an optical information reading apparatus comprising a light source, an optical system which can focus a light pencil from said light source and project it onto a recording medium including a track having recorded information and a light receiving device which is set within a far field zone of said track and includes a plurality of detectors divided respectively in the direction along said track and the direction intersecting at right angles with it with the optical axis as a center to receive through said optical system a light pencil reflected from said recording medium and modulated by the information recorded in said track, a part of said light pencil being covered in a predetermined position within said far field zone to detect a tracking signal representing a lag in the direction intersecting at right angles with the direction along said track between the light pencil from said light source and said track and the direction of the lag and to control the bias fluctuation in said tracking signal and wherein the output signal from at least a part of said detectors, onto which light in the region of the dividing lines of said detectors impinges, is excluded from the generation of the tracking signal.

* * * * *